United States Patent
Kim et al.

(10) Patent No.: US 10,353,240 B2
(45) Date of Patent: Jul. 16, 2019

(54) DISPLAY APPARATUS AND METHOD OF MANUFACTURING THE SAME

(71) Applicant: SAMSUNG DISPLAY CO., LTD., Yongin-si, Gyeonggi-do (KR)

(72) Inventors: Seon-Il Kim, Yongin-si (KR); Sungwon Cho, Yongin-si (KR); Ji Hun Kim, Yongin-si (KR); Yunjong Yeo, Yongin-si (KR); Sanggab Kim, Yongin-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/698,988

(22) Filed: Sep. 8, 2017

(65) Prior Publication Data
US 2018/0101057 A1 Apr. 12, 2018

(30) Foreign Application Priority Data
Oct. 7, 2016 (KR) ........................ 10-2016-0130090

(51) Int. Cl.
*G02F 1/1333* (2006.01)
*G02F 1/1335* (2006.01)

(52) U.S. Cl.
CPC .. *G02F 1/133528* (2013.01); *G02F 1/133514* (2013.01); *G02F 2001/133548* (2013.01)

(58) Field of Classification Search
CPC ............. G02F 1/1335; G02F 1/133528; G02F 1/1333; G02F 1/133345; G02F 2001/133548; G02B 5/3058; G02B 1/14; G02B 1/18
See application file for complete search history.

(56) References Cited

U.S. PATENT DOCUMENTS 7,106,507 B2 * 9/2006 Lee ........................ B82Y 30/00
216/24

FOREIGN PATENT DOCUMENTS

KR 10-2016-0060859 A 5/2016
KR 10-2016-0060860 A 5/2016

* cited by examiner

*Primary Examiner* — Thoi V Duong
(74) *Attorney, Agent, or Firm* — Lee & Morse, P.C.

(57) ABSTRACT

A display apparatus includes a wire grid pattern layer and a capping layer. The wire grid pattern layer includes protrusions having the same shape and spaced at uniform intervals to form a wire grid. The capping layer is on the wire grid pattern layer. The protrusions include metal, and the capping layer includes metal oxide which is an oxide of the metal.

11 Claims, 9 Drawing Sheets

DISPLAY APPARATUS AND METHOD OF MANUFACTURING THE SAME

CROSS-REFERENCE TO RELATED APPLICATION

Korean Patent Application No. 10-2016-0130090, filed on Oct. 7, 2016, and entitled, "Display Apparatus and Method of Manufacturing the Same," is incorporated by reference herein in its entirety.

BACKGROUND

1. Field

One or more embodiments described herein relate to a display apparatus and a method for manufacturing a display apparatus.

2. Description of the Related Art

A variety of displays have been developed. Examples include plasma displays, liquid crystal displays, and organic light emitting displays. These and other flat panel displays are thin, light weight, and have low-power-consumption.

In order to generate an image, a liquid crystal display applies a voltage to form a specific molecular arrangement in a liquid crystal layer. One type of liquid crystal display includes a wire grid polarizer which is internally (IN-CELL) formed. Optical characteristics of the wire grid polarizer may adversely affect display quality. In addition, the manufacturing process used to form a liquid crystal display having a wire grid polarizer is complicated.

SUMMARY

In accordance with one or more embodiments, a display apparatus includes a base substrate; a wire grid pattern layer including a plurality of protrusions having a same shape and spaced at uniform intervals to form a wire grid; and a capping layer on the wire grid pattern layer, wherein the protrusions include metal and wherein the capping layer includes metal oxide which is an oxide of the metal. The capping layer may include a bridge pattern which connects two hard mask patterns on two of the protrusions adjacent to each other, respectively, the bridge pattern includes the metal oxide. The metal of the wire grid pattern layer may be aluminum, and the metal oxide of the bridge pattern may be aluminum oxide.

A thickness of the capping layer may be about 100 Å (angstrom) to 600 Å. A thickness of the bridge pattern may be equal to or less than a thickness of the hard mask pattern. An air gap may be between the protrusions adjacent to each other. A silicon compound may not exist between the protrusions. The display apparatus may include a thin film transistor layer on the capping layer. The display apparatus may include a buffer layer between the capping layer and the thin film transistor layer.

In accordance with one or more other embodiments, a method for manufacturing a display apparatus includes forming a first layer on a first base substrate; forming a hard mask layer on the first layer; patterning the hard mask layer to form hard mask patterns; patterning the first layer using the hard mask patterns to form a wire grid pattern layer, the wire grid pattern layer including a plurality of protrusions having a same shape and spaced at uniform intervals to form a wire grid; and exposing a byproduct during forming the wire grid pattern layer to a water jet process, the water jet process to adhere the byproduct to the hard mask patterns to form a bridge pattern connecting hard mask patterns adjacent to each other, wherein the bridge pattern and the hard mask pattern form a capping layer covering the wire grid pattern layer. The jetting pressure of the water jet process may be about 120 kPa to 250 kA.

The hard mask layer may include silicon compound, and the first layer may include aluminum. The bridge pattern may include aluminum oxide. A thickness of the capping layer may be about 100 Å (angstrom) to 600 Å. A thickness of the bridge pattern may be equal to or less than a thickness of the hard mask pattern. An air gap may be formed between the protrusions adjacent to each other. A silicon compound may not exist between the protrusions.

Forming the hard mask pattern may include forming a resin layer on the hard mask layer; forming a resin pattern by imprinting an imprint mold onto the resin layer; and forming the mask pattern by patterning the hard mask layer using the resin pattern. The method may include forming a thin film transistor layer including a thin film transistor on the capping layer. The method may include forming a buffer layer on the capping layer before forming the thin film transistor layer.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
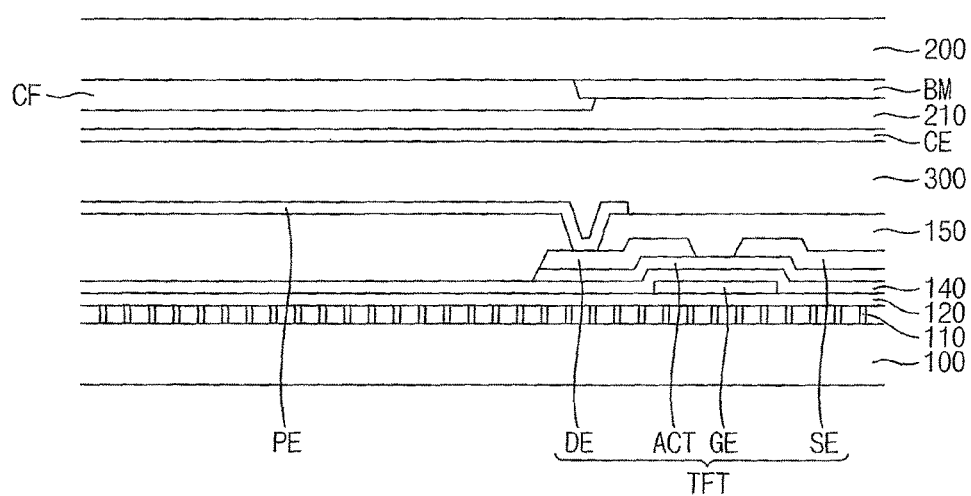
FIG. 1 illustrates an embodiment of a display apparatus.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates a cross-sectional view of an embodiment of a display apparatus which may include a liquid crystal layer 300 between a lower substrate and a upper substrate. The lower substrate may include a first base substrate 100, a wire grid pattern layer 110, a capping layer 120, a gate pattern, a first insulation layer 140, an active pattern ACT, a data pattern, a second insulation layer 150, and a pixel electrode PE. The upper substrate may include a second base substrate 200, a black matrix BM, a color filter CF, an over-coating layer 210 and a common electrode CE.

The first base substrate 100 may include a material having excellent light transmittance, heat resistance, and chemical resistance. The first base substrate 100 may include, for example, a glass substrate, a quartz substrate, a transparent resin substrate, etc. Examples of the transparent resin substrate for the first base substrate 100 may include polyimide-based resin, acryl-based resin, polyacrylate-based resin, polycarbonate-based resin, polyether-based resin, sulfonic acid containing resin, polyethyleneterephthalate-based resin, etc.

The wire grid pattern layer 110 may be on the first base substrate 100 and may include a plurality of protrusions having same shape and formed at uniform intervals to form a wire grid. The protrusions may have pitch of about 50 nm (nanometers) to 150 nm. The pitch may correspond to the sum of the width of one of the protrusion and the distance between protrusions that are adjacent to each other.

The wire grid pattern layer 110 may include metal. For example, the wire grid pattern layer 110 may include aluminum (Al), titanium (Ti), gold (Au), chromium (Cr), silver (Ag), copper (Cu), nickel (Ni), iron (Fe), cobalt (Co), or a combination thereof.

An air gap AG may be between adjacent protrusions of the wire grid pattern layer 110. Air may be filled in the air gap AG.

The capping layer 120 may be on the wire grid pattern layer 110. An upper surface of the capping layer 120 may be designed to be flat, but may not actually be flat because of various conditions in the manufacturing process.

The gate pattern may be on the capping layer 120 and may include metal, alloy, conductive metal oxide, a transparent conductive material, etc. The gate pattern may include a gate electrode GE and a signal line (e.g., gate line) for transmitting a driving signal of a pixel.

The first insulation layer 140 may be on the capping layer 120, on which the gate pattern is disposed. The first insulation layer 140 may include an inorganic insulation material. For example, the first insulation layer 140 may include silicon compound such as silicon oxide (SiOx), silicon nitride (SiNx), silicon oxynitride (SiOxNy), silicon oxycarbide (SiOxCy), silicon carbonitride (SiCxNy). In example embodiments, the first insulation layer 140 may be uniformly formed on the capping layer 120 along a profile of the gate pattern. The first insulation layer 140 may have a substantially small thickness, so that a stepped portion may be formed at a portion of the first insulation layer 140 adjacent to the gate pattern. In some example embodiments, the first insulation layer 140 may have a relatively large thickness for sufficiently covering the gate pattern, so that the first insulation layer 140 may have a substantially level surface.

The active pattern ACT may overlap the gate electrode GE on the first insulation layer 140. The active pattern Act may include source and drain area, which is impurity-doped area, and a channel area between the source area and the drain area.

The data pattern may be on the active pattern ACT and may include a source electrode SE in electrical contact with the source area of the active pattern ACT and a drain electrode DE in electrical contact with the drain area of the active pattern ACT. The data pattern may include metal, alloy, conductive metal oxide, a transparent conductive material, etc. The data pattern may further include a signal line (e.g., a data line) for transmitting a driving signal of the pixel.

The gate electrode GE, the active pattern ACT, the source electrode SE, and the drain electrode DE may be correspond to a thin film transistor TFT.

The second insulation layer 150 may be on the first insulation layer 140, on which the data pattern is disposed. The second insulation layer 150 may have a single-layered structure or a multi-layered structure including at least two insulation films. The second insulation layer 150 may be formed using an organic material. For example, the second insulation layer 150 may include photoresist, acryl-based resin, polyimide-based resin, polyamide-based resin, siloxane-based resin, etc., or a combination thereof. The second insulation layer 150 may have a relatively large thickness for sufficiently covering the active pattern and the data pattern, so that the second insulation layer 150 may have a substantially level surface. In some example, embodiment, the second insulation layer 150 may include inorganic material.

The pixel electrode PE may be on the second insulation layer 150 and may be electrically connected to the drain electrode DE of the thin film transistor TFT, through a contact hole CNT formed through the second insulation layer 150. The pixel electrode PE may include a transparent conductive material, e.g., indium tin oxide (ITO), indium zinc oxide (IZO), etc.

The second base substrate 200 may face the first base substrate 100 and may include a material having excellent light transmittance, heat resistance, and chemical resistance. The second base substrate 200 may include, for example, a glass substrate, a quartz substrate, a transparent resin substrate, etc.

The black matrix BM may be on the second base substrate 200 and may corresponding to a region which is outside of a region where the image is displayed and may block light. Thus, the black matrix BM may overlap the data line, the gate line, and the thin film transistor TFT.

The color filter CF may be on the second base substrate 200, on which the black matrix BM is disposed. The color filters CF may provide color to light transmitted through the liquid crystal layer 300. The color filters CF may be, for example, a red color filter (red), a green color filter (green), and a blue color filter (blue). The color filters CF may correspond to each of the pixels. In one embodiment, the different color filters CF may be arranged for adjacent pixels. The color filters CF may partially overlap adjacent color filters CF at boundaries of adjacent pixel, or the color filters CF may be spaced from the boundaries of adjacent pixels.

The over-coating layer 210 may be on the black matrix BM and the color filter CF. The over-coating layer 210 may planarize and protect the black matrix BM and the color filter CF and insulate the common electrode CE. The over-coating layer 210 may be formed, for example, of an acrylic epoxy compound.

The common electrode CE may be on the over-coating layer 210 and may include a transparent conductive material. The common electrode CE may include, for example, indium tin oxide (ITO), indium zinc oxide (IZO), etc.

The liquid crystal layer 300 may be between the lower substrate and the upper substrate. The liquid crystal layer 300 may include liquid crystal molecules having optical anisotropy. The liquid crystal molecules may be driven by an electric field to transmit or block light passing through the liquid crystal layer 300 to display the image.

The common electrode CE, the color filter CF, and the black matrix BM are illustrated to be in the upper substrate. In one embodiment, the common electrode CE, the color filter CF, and the black matrix BM may be arranged in a different manner or be different located in another embodiment.

Figure 2:
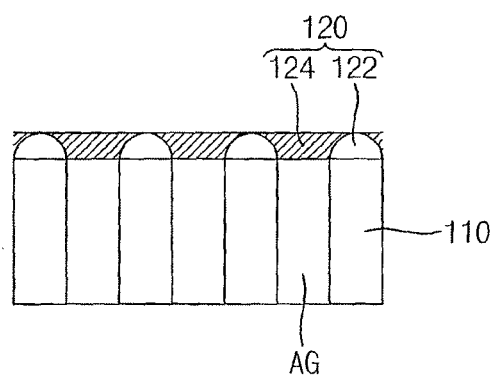
FIG. 2 illustrates an embodiment including a wire grid pattern layer and a capping layer.

FIG. 2 illustrates an enlarged view of an embodiment of a wire grid pattern layer and a capping layer in FIG. 1. Referring to FIG. 2, the capping layer 120 may include a hard mask pattern 122 and a bridge pattern 124. The hard mask pattern 122 may be on each of the protrusions of the wire grid pattern layer 110. The bridge pattern 124 may be formed to connect the hard mask patterns 122 that are adjacent to each other.

The hard mask pattern 122 may be transparent and may be formed using a conductive metal material or may be formed using a nonconductive material. For example, the hard mask pattern 122 may include an inorganic insulation material such as silicon compound. The hard mask pattern 122 may include, for example, silicon oxide (SiOx). The thickness of the hard mask pattern 122 may be, for example, about 100 Å (angstrom) to 600 Å.

The cross-sectional shape of the hard mask pattern 122 is illustrated to be a semicircle. In other example embodiments, the cross-sectional shape of the hard mask pattern 122 may be different, e.g., semi-elliptical, rectangular, triangular, trapezoidal, or another shape. In one embodiment, different shapes may be formed for different thickness sections.

The bridge pattern 124 may connect the hard mask patterns 122 which are adjacent to each other. The bridge pattern 124 may therefore form a roof between the protrusions of the wire grid pattern layer 110. Accordingly, an air gap (AG) may be formed between the protrusions. The bridge pattern 124 may be formed as a byproduct of patterning the wire grid pattern layer 110. For example, when the wire grid pattern layer 110 includes aluminum, the bridge pattern 124 may include aluminum oxide ($AlO_x$).

In one embodiment, the thickness of the bridge pattern 124 may be same as the thickness of the hard mask pattern 122, to allow an upper surface of the capping layer 120 to be flat. However, due to conditions of the manufacturing process, the thickness of the bridge pattern 124 may be less than the thickness of the hard mask pattern 122. For example, when the thickness of the bridge pattern 124 is about 300 Å to 500 Å, the thickness of the bridge pattern 124 may be about 200 Å to 400 Å.

Figure 3:
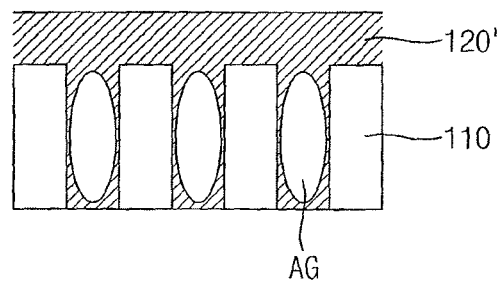
FIG. 3 illustrates a proposed arrangement including a wire grid pattern layer and a capping layer.

FIG. 3 is a cross-sectional view of a proposed arrangement which includes a wire grid pattern layer and a capping layer. Referring to FIG. 3, a capping layer 120' is formed on a wire grid pattern layer 110. The capping layer 120' is formed using silicon oxide (SiOx) or silicon nitride (SiNx). The capping layer 120' is formed by chemical vapor deposition (CVD) after forming the wire grid pattern layer 110. The silicon oxide or the silicon nitride flows into a space between protrusions of the wire grid pattern layer 110. As a result, the size of an air gap GP becomes small. Accordingly, extinction ratio and transmittance are reduced and optical characteristics of the wire grid polarizer adversely affected.

Referring again to FIG. 2, the capping layer 120 of the display apparatus of the present embodiment is formed, not by a separate deposition process after forming the wire grid pattern layer 110, but by the hard mask pattern 122 which is formed before patterning the wire grid pattern layer 110 and the bridge pattern 124, which is formed from the byproduct formed during patterning of the wire grid pattern layer 110. Accordingly, no foreign matter flows into the air gap AG, and thus formation of an air gap AG of sufficient size may be ensured. As a result, the extinction ratio and the transmittance of the wire grid polarizer may be improved over those of the wire grid polarizer in FIG. 3.

In addition, it is not necessary to form a separate capping layer (capping layer using a previously used silicon compound) on the wire grid pattern layer 110. As a result, the manufacturing process may be simplified.

Figure 4:
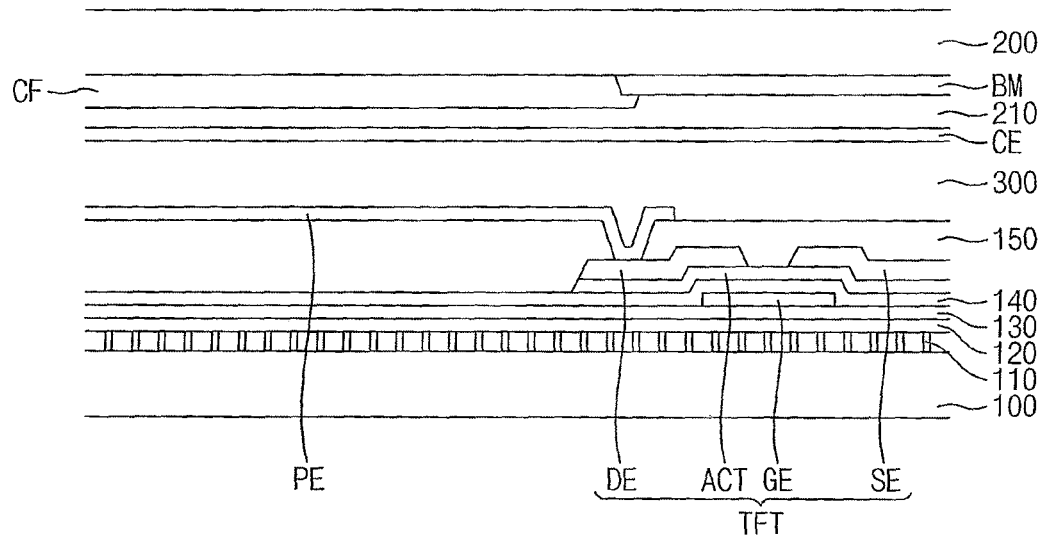
FIG. 4 illustrates another embodiment of a display apparatus.
Figure 5:
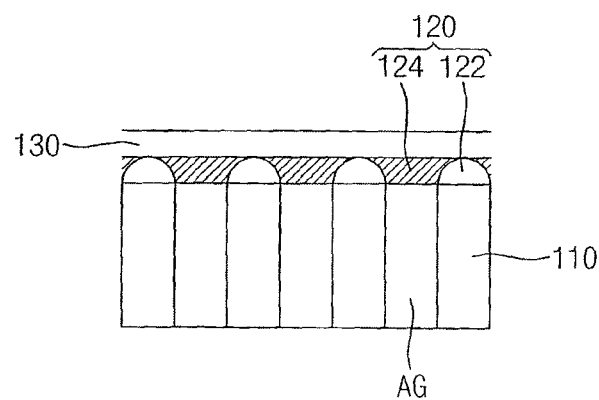
FIG. 5 illustrates another embodiment including a wire grid pattern layer and a buffer layer.

FIG. 4 is a cross-sectional view illustrating another embodiment of a display apparatus, and FIG. 5 illustrates an enlarged view of a wire grid pattern layer and a buffer layer of the display apparatus of FIG. 4. Referring to FIGS. 4 and 5, the display apparatus may be substantially same as a display apparatus of FIG. 1, except that the display apparatus further includes a buffer layer 130.

The display apparatus may include a liquid crystal layer 300 between a lower substrate and a upper substrate. The lower substrate may include a first base substrate 100, a wire grid pattern layer 110, a capping layer 120, a buffer layer 130, a gate pattern, a first insulation layer 140, an active pattern ACT, a data pattern, a second insulation layer 150, and a pixel electrode PE. The upper substrate may include a second base substrate 200, a black matrix BM, a color filter CF, an over-coating layer 210, and a common electrode CE.

The wire grid pattern layer 110 may be on the first base substrate 100. The capping layer 120 may be on the wire grid pattern layer 110. The capping layer 120 may include a hard mask pattern 122 and a bridge pattern 124.

A buffer layer 130 may be on the capping layer 120 and may planarize an upper surface of the capping layer 120 when the upper surface of the capping layer 120 is not flat. The buffer layer 130 may be formed, for example, of an inorganic insulation material or an organic insulation material.

The gate pattern may be on the buffer layer 130 and may include a gate electrode GE and a signal line for transmitting a driving signal of a pixel such as a gate line. The first insulation layer 140 may be on the buffer layer 130, on which the gate pattern is disposed. The active pattern ACT may overlap the gate electrode GE on the first insulation layer 140. The data pattern may be on the active pattern ACT and may include a source electrode SE and a drain electrode DE. The data pattern may further include a signal line (e.g., data line) for transmitting a driving signal of the pixel.

The gate electrode GE, the active pattern ACT, the source electrode SE, and the drain electrode DE may be in a thin film transistor TFT.

The second insulation layer 150 may be on the first insulation layer 140, on which the data pattern is disposed. The pixel electrode PE may be on the second insulation layer 150.

The second base substrate 200 may face the first base substrate 100. The black matrix BM may be on the second base substrate 200. The color filter CF may be on the second base substrate 200, on which the black matrix BM is disposed. The over-coating layer 210 may be on the black matrix BM and the color filter CF. The common electrode CE may be on the over-coating layer 210. The common electrode CE may include, for example, a transparent conductive material.

Figure 6A:
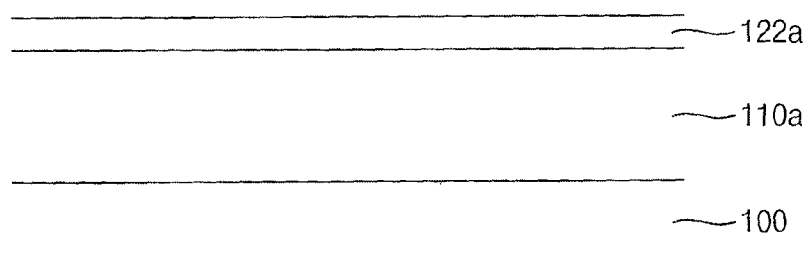
FIGS. 6A to 6G illustrate various stages of an embodiment of a method for manufacturing a display apparatus.

FIGS. 6A to 6G are cross-sectional views illustrating an embodiment of a method for manufacturing the display apparatus of FIG. 1. Referring to FIG. 6A, a first layer 110a may be formed on a first base substrate 100. The first layer 110a may include metal, e.g., aluminum (Al), titanium (Ti), gold (Au), chromium (Cr), silver (Ag), copper (Cu), nickel (Ni), iron (Fe), cobalt (Co), or a combination thereof.

A hard mask layer 122a may be formed on the first layer 110a. The hard mask layer 122a may be formed using a conductive metal material or a nonconductive material. For example, the hard mask layer 122a may include an inorganic insulation material such as silicon compound. The hard mask layer 122a may include, for example, silicon oxide (SiOx). The thickness of the hard mask layer 122a may be, for example, about 100 Å (angstrom) to 600 Å.

Figure 6B:
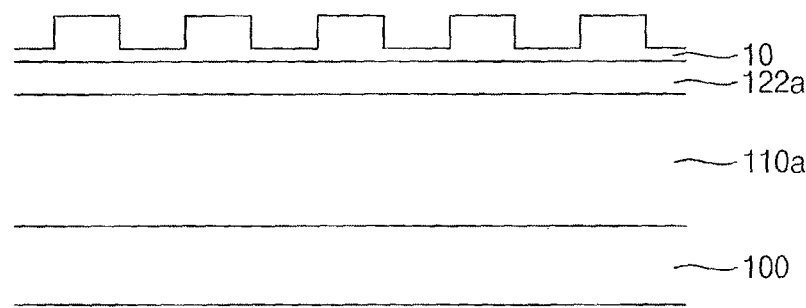

Referring to FIG. 6B, a resin pattern 10 may be formed on the hard mask layer 122a. For example, the resin pattern 10 may be formed, for example, by an imprint process using an imprint mold. A resin layer may be formed on the hard mask layer 122a. Then, the imprint mold for forming a wire grid pattern may be imprinted onto the resin layer to form the resin pattern 10.

Figure 6C:
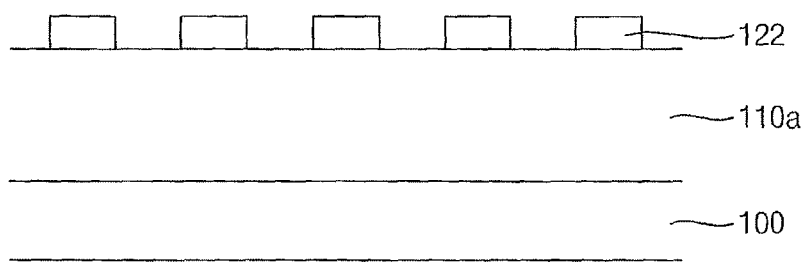

Referring to FIG. 6C, a hard mask pattern 122 may be formed by patterning the hard mask layer 122a using the resin pattern 10. The hard mask pattern 122 may have a pitch about 50 nm (nanometers) to 150 nm corresponding to the wire grid pattern. The pitch may correspond to the sum of the width of a fine wire of the hard mask pattern and the distance between fine wires of the hard mask pattern which are adjacent to each other. The thickness of the hard mask pattern 122a may be slightly reduced.

Figure 6D:
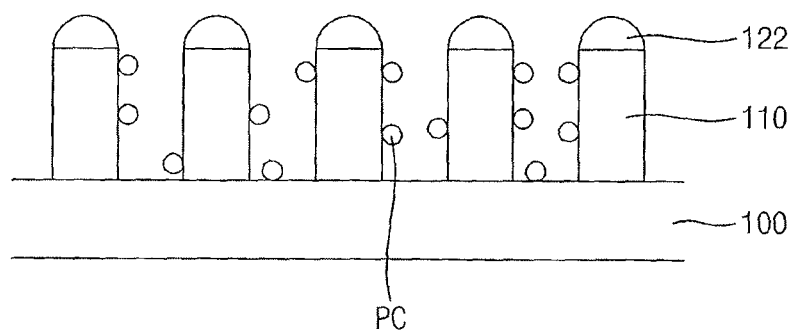

Referring to FIG. 6D, a wire grid pattern layer 110 may be formed by pattering the first layer 110a using the hard mask pattern 122. The wire grid pattern layer 110 may include a plurality of protrusions having same shape and formed at uniform intervals to form a wire grid. A cross-sectional shape of the hard mask pattern 122 may be semicircular, semi-elliptical, rectangular, triangular, trapezoidal, or another shape. In one embodiment, different shapes may correspond different thickness sections.

When the wire grid pattern layer 110 is patterned, byproduct (particles) PC may be formed at a space between the protrusions of the wire grid pattern layer 110. For example, foreign substances generated in an etching process or metal oxide which is oxide of the metal from the wire grid pattern layer 110 may be included in the byproduct PC. The byproduct PC may cause deterioration of extinction ratio and transmittance, and cause deterioration of optical characteristics of the wire grid polarizer.

Figure 6E:
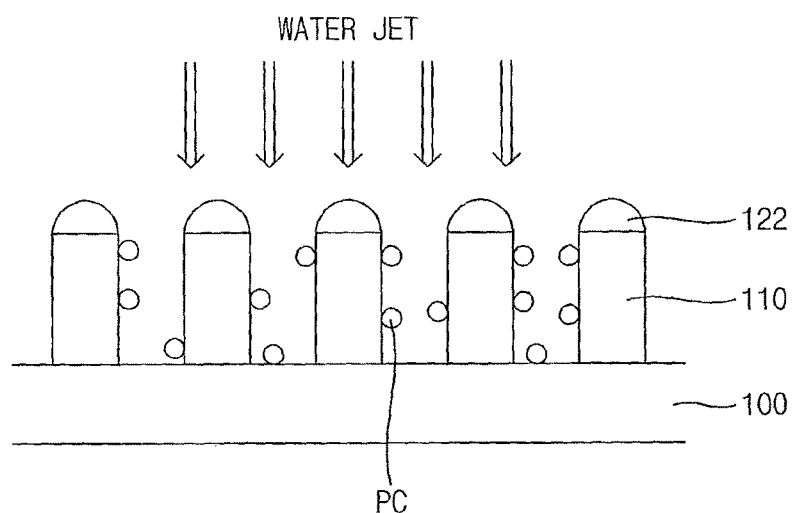

Referring to FIG. 6E, the first base substrate 100 on which the wire grid pattern layer 110 may be treated by water jet process. This is for removing the byproducts PC in the space between the protrusions, and jetting pressure of the water jet process may be about 120 kpa or more. Preferably, the jetting pressure of the water jet process may be about 120 kPa to 250 kA. If the jetting pressure of the water jet process is too low, the byproducts PC can not be moved from the space, and if the jetting pressure of the water jet process is too high, the wire grid pattern layer 110 may be damaged.

Figure 6F:
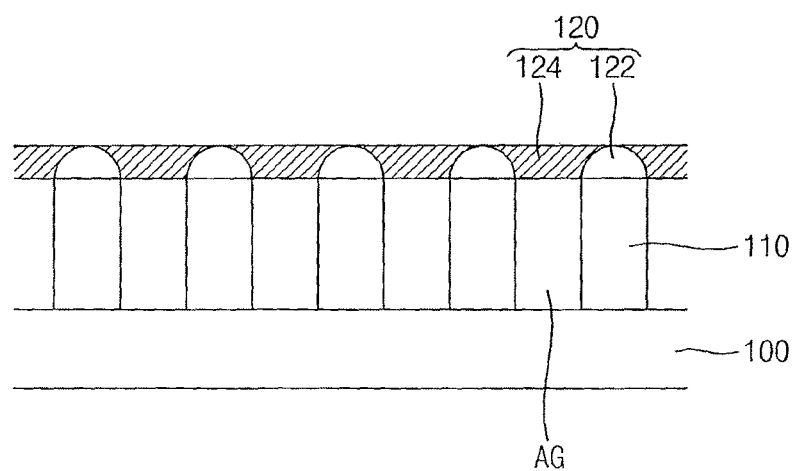

Referring to FIG. 6F, as a result of the water jet process, the byproduct PC escapes from the space between the protrusions and sticks around the hard mask pattern 122, resulting in a bridge formed between the hard mask patterns 122 neighboring each other. Accordingly, a bridge pattern 124 connecting the hard mask patterns 122 may be formed therebetween. Thus, the bridge pattern 124 may be formed by the water jet process, so that the byproduct PC exits the space and adheres to the hard mask pattern 122 on the wire grid pattern 110 to form the bridge pattern 124. As the byproduct PC adhere to the hard mask pattern 122, other by-product PC in the space between the protrusions become more difficult to escape from the space, accelerating the formation of the bridge pattern.

Accordingly, a capping layer 120 including the bridge pattern 124 and the hard mask pattern 124 may be formed. The bridge pattern 124 of the capping layer 120 has a sufficiently thin predetermined thickness. When the wire grid pattern layer includes aluminum, the capping layer 120 is made of aluminum oxide as a main component in order to be transparent.

In addition, an air gap AG may be formed between the protrusions of the wire grid pattern layer 110 as the capping layer 120 is formed. The byproduct PC may be reduced or minimized in the space between the protrusions, so that the extinction ratio and transmittance of the wire grid polarizer may be improved.

In addition, since the capping layer 120 is formed in a state where there is no foreign material between the protrusions, unlike the case of forming the capping layer in other proposed processes, the problem of silicon compounds or the like flowing into the space between the protrusions (to reduce the size of the air gap) may be solved.

In addition, it is not necessary to form a separate capping layer (e.g., capping layer using a previously used silicon compound) on the wire grid pattern layer 110. As a result, the manufacturing process may be simplified.

Figure 6G:
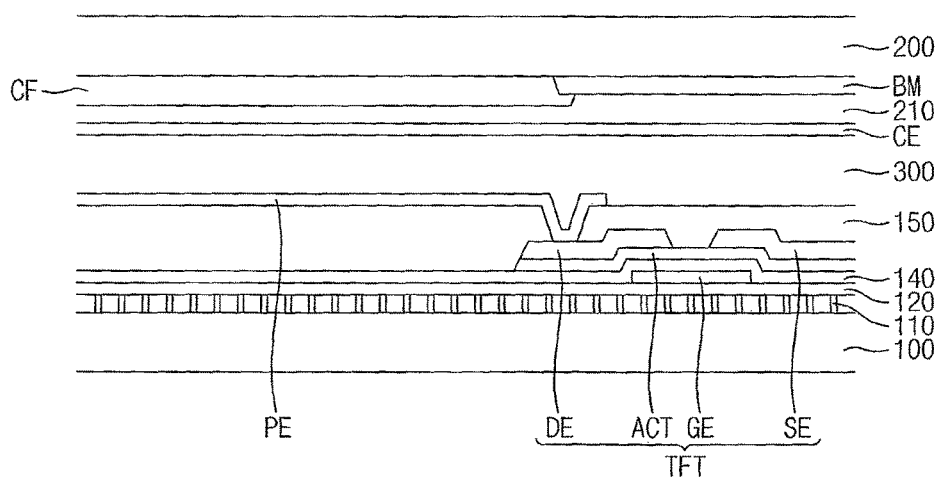

Referring to FIG. 6G, various elements of the display apparatus may be formed on the capping layer 120. Thus, a gate pattern including a gate electrode GE may be formed on the capping layer 120. The first insulation layer 140 may be formed on the capping layer 120, on which the gate pattern is formed. The active pattern ACT and a data pattern including a source electrode SE and a drain electrode DE may be formed on the first insulation layer 140. The second insulation layer 150 may be formed on the first insulation layer 140, on which the data pattern is formed. The pixel electrode PE may be formed on the second insulation layer 150.

Accordingly, a lower substrate including the first base substrate 100, the wire grid pattern layer 110, the capping layer 120, the gate pattern, the first insulation layer 140, the active pattern ACT, the data pattern, the second insulation layer 150, and the pixel electrode PE may be provided.

A black matrix BM may be formed on a second base substrate 200. A color filter CF may be formed on the second base substrate 200 on which the black matrix BM is formed. An over-coating layer 210 may be formed on the black matrix BM and the color filter CF. A common electrode CE may be formed on the over-coating layer 210.

Accordingly, an upper substrate including the second base substrate 200, the black matrix BM, the color filter CF, the over-coating layer 210, and the common electrode CE may be provided.

Then, the liquid crystal layer 300 may be formed between the upper substrate and the lower substrate to provide the display apparatus.

In the method of manufacturing a display apparatus according to present embodiment, the common electrode CE, the color filter CF, and the black matrix BM are included in the upper substrate. In another embodiment, one or more of these features may be at different locations.

Figure 7A:
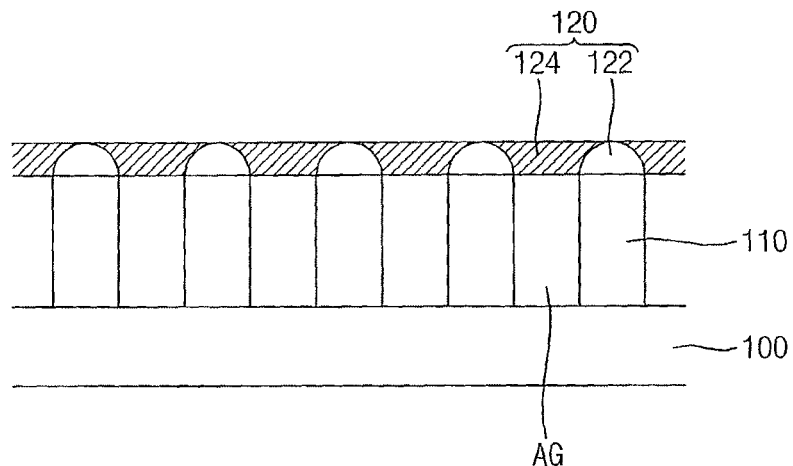
FIGS. 7A to 7C illustrate various stages of another embodiment of a method for manufacturing a display apparatus.
Figure 7B:
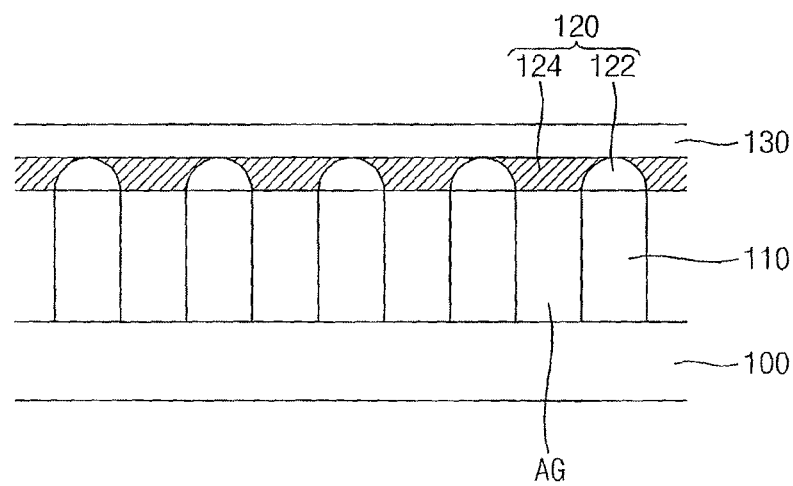
Figure 7C:
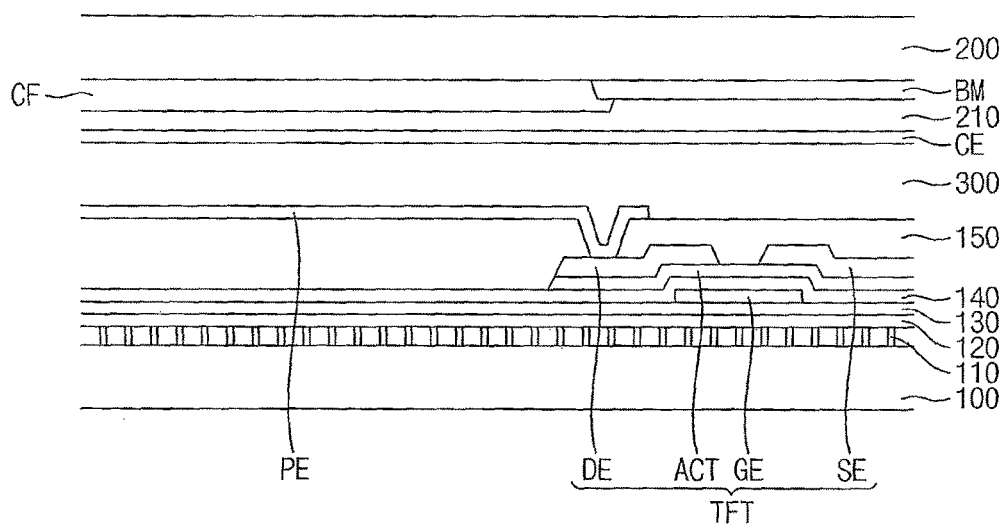

FIGS. 7A to 7C are cross-sectional views illustrating an embodiment of a method for manufacturing the display apparatus of FIG. 4. The method may be substantially same as the method of FIGS. 6A to 6G, except that the method further includes forming a buffer layer.

Referring to FIG. 7A, a first layer may be formed on a first base substrate 100. A hard mask layer may be formed on the first layer. A resin pattern may be formed on the hard mask layer. A hard mask pattern 122 may be formed by patterning the hard mask layer using the resin pattern. A wire grid pattern layer 110 may be formed by patterning the first layer using the hard mask pattern 122. The first base substrate 100 on which the wire grid pattern layer 110 may be treated by water jet process.

Accordingly, the first base substrate 100, the wire grid pattern layer 110 and a capping layer 120 including the hard mask pattern 122 and a bridge pattern 124 may be provided. This process may be substantially the same as that of FIGS. 6A to 6F.

Referring to FIG. 7B, a buffer layer 130 may be the capping layer 120 and may planarize an upper surface of the capping layer 120 when the upper surface of the capping layer 120 is not flat. The buffer layer 130 may be formed, for example, of an inorganic insulation material or an organic insulation material. The buffer layer 130 may be obtained, for example, by a spin coating process, a printing process, a sputtering process, a chemical vapor deposition (CVD) process, an atomic layer deposition (ALD) process, a plasma enhanced chemical vapor deposition (PECVD) process, a high density plasma-chemical vapor deposition (HDP-CVD) process or a vacuum evaporation process in accordance with materials in the buffer layer 130.

Because the capping layer 120 already covers the wire grid pattern layer 110, material constituting the buffer layer 130 may not flow into the air gap AG between the protrusions of the wire grid pattern layer 110.

Referring to FIG. 7C, various elements of the display apparatus may be formed on the buffer layer 130. Thus, a gate pattern including a gate electrode GE may be formed on the buffer layer 130. The first insulation layer 140 may be formed on the buffer layer 130, on which the gate pattern is formed. The active pattern ACT and a data pattern including a source electrode SE and a drain electrode DE may be formed on the first insulation layer 140. The second insulation layer 150 may be formed on the first insulation layer 140 on which the data pattern is formed. The pixel electrode PE may be formed on the second insulation layer 150.

Accordingly, a lower substrate including the first base substrate 100, the wire grid pattern layer 110, the capping layer 120, the buffer later 130, the gate pattern, the first insulation layer 140, the active pattern ACT, the data pattern, the second insulation layer 150, and the pixel electrode PE may be provided.

A black matrix BM may be formed on a second base substrate 200. A color filter CF may be formed on the second base substrate 200, on which the black matrix BM is formed. An over-coating layer 210 may be formed on the black matrix BM and the color filter CF. A common electrode CE may be formed on the over-coating layer 210.

Accordingly, an upper substrate including the second base substrate 200, the black matrix BM, the color filter CF, the over-coating layer 210, and the common electrode CE may be provided. Then, the liquid crystal layer 300 may be formed between the upper substrate and the lower substrate to provide the display apparatus.

In accordance with one or more of the aforementioned embodiments, a display apparatus includes a capping layer covering a wire grid pattern layer. The capping layer is formed, not by a separate deposition process after forming the wire grid pattern layer, but by a hard mask pattern which is formed before patterning the wire grid pattern layer and a bridge pattern formed from a byproduct of patterning of the wire grid pattern layer. Accordingly, no foreign matter flows into an air gap between protrusions of the wire grid pattern layer. As a result, formation of an air gap of sufficiently large size may be ensured. Also, the extinction ratio and the transmittance of the wire grid polarizer may be improved.

In addition, the display apparatus may include a buffer layer on the capping layer. The buffer layer may be formed after the capping layer covering the wire grid pattern layer is formed. Thus, material of the buffer layer may not flow into the air gap between the protrusions of the wire grid pattern layer.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A method for manufacturing a display apparatus, the method comprising:
   forming a first layer on a first base substrate;
   forming a hard mask layer on the first layer;
   patterning the hard mask layer to form hard mask patterns;
   pattering the first layer using the hard mask patterns to form a wire grid pattern layer, the wire grid pattern layer including a plurality of protrusions having a same shape and spaced at uniform intervals to form a wire grid; and
   exposing a byproduct during forming the wire grid pattern layer to a water jet process, the water jet process performed to adhere the byproduct to the hard mask patterns to form a bridge pattern connecting hard mask patterns adjacent to each other, wherein the bridge pattern and the hard mask pattern form a capping layer covering the wire grid pattern layer.

2. The method as claimed in claim 1, wherein a jetting pressure of the water jet process is about 120 kPa to 250 kA.

3. The method as claimed in claim 1, wherein:
   the hard mask layer includes silicon compound, and
   the first layer includes aluminum.

4. The method as claimed in claim 3, wherein the bridge pattern includes aluminum oxide.

5. The method as claimed in claim 1, wherein a thickness of the capping layer is about 100 Å (angstrom) to 600 Å.

6. The method as claimed in claim 1, wherein a thickness of the bridge pattern is equal to or less than a thickness of the hard mask pattern.

7. The method as claimed in claim 1, wherein an air gap is formed between the protrusions adjacent to each other.

8. The method as claimed in claim 1, wherein a silicon compound does not exist between the protrusions.

9. The method as claimed in claim 1, wherein forming the hard mask pattern includes:
   forming a resin layer on the hard mask layer;
   forming a resin pattern by imprinting an imprint mold onto the resin layer; and
   forming the mask pattern by patterning the hard mask layer using the resin pattern.

10. The method as claimed in claim 1, further comprising:
    forming a thin film transistor layer including a thin film transistor on the capping layer.

11. The method as claimed in claim 10, further comprising:
    forming a buffer layer on the capping layer before forming the thin film transistor layer.

\* \* \* \* \*